United States Patent
Zasu et al.

(10) Patent No.: US 7,784,832 B2
(45) Date of Patent: Aug. 31, 2010

(54) PRETENSIONER AND SEAT BELT APPARATUS

(75) Inventors: Kazuhito Zasu, Tokyo (JP); Hiroshi Tomita, Tokyo (JP)

(73) Assignee: Takata Corporation, Tokyo (JP)

( * ) Notice: Subject to any disclaimer, the term of this patent is extended or adjusted under 35 U.S.C. 154(b) by 186 days.

(21) Appl. No.: 11/990,993

(22) PCT Filed: Nov. 1, 2006

(86) PCT No.: PCT/JP2006/321859
§ 371 (c)(1),
(2), (4) Date: Feb. 26, 2008

(87) PCT Pub. No.: WO2007/052700
PCT Pub. Date: May 10, 2007

(65) Prior Publication Data
US 2009/0115179 A1     May 7, 2009

(30) Foreign Application Priority Data
Nov. 4, 2005   (JP) .............................. 2005-321270

(51) Int. Cl.
*B60R 22/34* (2006.01)
(52) U.S. Cl. .................. 280/807; 280/805; 280/806
(58) Field of Classification Search .............. 280/805, 280/806, 807
See application file for complete search history.

(56) References Cited

U.S. PATENT DOCUMENTS

| 4,508,287 | A | * | 4/1985 | Nilsson | 242/374 |
| 5,286,053 | A | * | 2/1994 | Lenzen et al. | 280/734 |
| 5,450,723 | A | * | 9/1995 | Fohl | 60/638 |
| 5,897,140 | A | * | 4/1999 | Wier | 280/806 |
| 6,250,682 | B1 | * | 6/2001 | Betz et al. | 280/806 |
| 6,877,776 | B2 |   | 4/2005 | Ukita et al. | |
| 2009/0115179 | A1 | * | 5/2009 | Zasu et al. | 280/806 |
| 2009/0184508 | A1 | * | 7/2009 | Kohama | 280/806 |

FOREIGN PATENT DOCUMENTS

| JP | H06-298040 | 10/1994 |
| JP | H07-052736 | 2/1995 |
| JP | H10-324224 | 12/1998 |
| JP | 2003-146184 | 5/2003 |

* cited by examiner

*Primary Examiner*—Paul N. Dickson
*Assistant Examiner*—Barry Gooden, Jr.
(74) *Attorney, Agent, or Firm*—Manabu Kanesaka

(57) ABSTRACT

To protect a wire without increasing the manufacturing cost.

A pretensioner 10 comprises a housing 12 through which the wire 11 is passed and a cylinder 14 supported to the housing 12. One end of the wire 11 is connected to a seat belt buckle, and the other end of the wire 11 is connected to a piston 15 slidably received in the cylinder 14. A gas generator 23 for generating a high-pressure gas for moving the piston 15 in the direction of retracting the wire 11 is provided on the housing 12. Furthermore, a seal member 30 for sealing a clearance between the wire 11 and the inner wall of the housing 12 is provided in the housing 12. An agent for improving heat resistance is applied onto an agent applied portion 11A of the wire 11 positioned within a gas passage 24.

5 Claims, 4 Drawing Sheets

PRETENSIONER AND SEAT BELT APPARATUS

TECHNICAL FIELD

The present invention relates to a pretensioner and a seat belt apparatus which retracts a seat belt buckle at the time of a rapid deceleration of a vehicle so as to restrain an occupant with a seat belt.

BACKGROUND ART

Conventionally, vehicles are equipped with seat belt apparatuses for restraining occupants each of which prevents the occupant from being thrown forward due to an inertial force when an impact is generated, for example, at the time of a rapid deceleration or a collision of the vehicle. Such a seat belt apparatus is generally provided with an Emergency Locking Retractor (hereinafter, referred to as an ELR) which does not restrain motion of the occupant in normal driving but locks a winding shaft for the seat belt to prevent the seat belt from being further withdrawn only when an impact is generated to the vehicle. The ELR locks the winding shaft within a very short time after detecting a deceleration equal to or higher than a predetermined value, thereby preventing the seat belt from being further withdrawn.

However, according to the aforementioned ELR which merely locks the winding shaft, in case where the seat belt is loosely wound onto the winding shaft when worn by the occupant, a certain amount of the seat belt may be withdrawn even when the winding shaft is locked. Even when the seat belt is not loosely wound, the seat belt may still be withdrawn between the time of detection of a deceleration equal to or higher than the predetermined value and the time of locking of the winding shaft.

As a device for canceling the looseness of the seat belt and the withdrawal of the seat belt caused by the time lag until the winding shaft is locked to some extent, there is known a pretensioner which retracts the seat belt buckle when a predetermined deceleration is detected (see Patent document 1, for example).

The pretensioner as disclosed in Patent document 1 comprises a wire of which one end is connected to a seat belt buckle and the other end is fixed to a piston in a cylinder and a housing through which the wire is passed and which supports the cylinder. According to this pretensioner, when a deceleration of the vehicle is detected, high-pressure gas is spouted into a gas chamber formed in the housing so as to move the piston, thereby retracting the wire. In the gas chamber of the housing, a guide pipe is disposed to protect the wire from the high-pressure gas. In the housing, a packing for sealing a clearance between the wire and the housing is disposed adjacent to the guide pipe.

Patent document 1: JP-A-2003-146184 (FIG. 2 and FIG. 4).

DISCLOSURE OF THE INVENTION

Problems to be Solved by the Invention

However, in the aforementioned prior art, it is necessary to separately prepare the guide pipe for protecting the wire, thus leading to increase in number of parts, making the assembly cumbersome and complicated, and leading to increase in manufacturing cost.

Therefore, the object of the present invention is to provide a pretensioner and a seat belt apparatus capable of projecting a wire without leading to increase in manufacturing cost.

Means for Solving the Problems

To achieve the aforementioned object, the first invention is a pretensioner for restraining an occupant with a seat belt by retracting a seat belt buckle at the time of generation of an impact to a vehicle, comprising: a wire of which one end is connected to said seat belt buckle; a piston which is connected to the other end of said wire; a cylinder which accommodates said piston therein such that said piston is slidable; a housing through which said wire is passed and which supports said cylinder; a gas supply unit which supplies gas, for moving said piston in a direction of retracting said wire, into said cylinder through said housing; and a seal member which is disposed inside said housing to seal a clearance between said wire and the inner wall of said housing, and is characterized in that an agent for improving the heat resistance is applied to said wire.

In the pretensioner having the aforementioned structure, gas for moving the piston (hereinafter, referred to as high-pressure gas) is spouted out from the gas supply unit at the time of generation of an impact to a vehicle. The high-pressure gas is supplied to the cylinder through the inside of the housing. Then, the piston is moved by the high-pressure gas to retract the wire, thereby retracting the seat belt buckle.

Since the heat resistance of the wire is improved by applying the aforementioned agent to the wire, the wire is protected even if the high-pressure gas spouted out from the gas supply unit into the housing collides with the wire. This can eliminate the need for separately preparing a guide pipe as the prior art, thereby reducing the number of parts, solving the problem of complication of assembly, and thus reducing the manufacturing cost.

The second invention is characterized in that, in the aforementioned first invention, said agent is applied to at least a portion, positioned inside said housing, of said wire.

Since the agent is applied to a portion inside the housing where can be exposed to the high-pressure gas from the gas supply unit, it is possible to protect the wire from the high-pressure gas.

The third invention is characterized in that, in the aforementioned second invention, said agent is applied to at least a portion, positioned between said seal member and said piston, of said wire positioned within said housing.

Since the agent is applied to a portion between the seal member and the piston within the housing where is easily exposed to the high-pressure gas from the gas supply unit, it is possible to protect the wire from the high-pressure gas.

The fourth invention is characterized in that, in any of the aforementioned first through third inventions, said agent is at least one of a group consisting of cyanoacrylate agent, silicone agent, and epoxy agent.

This enables to improve the heat resistance of the wire to which the agent is applied, thereby protecting the wire from high-temperature and high pressure gas spouted out from the gas supply unit.

To achieve the aforementioned object, the fifth invention is a seat belt apparatus comprising: a seat belt; a retractor for winding up said seat belt; a tongue attached to said seat belt; a seat belt buckle with which said tongue is detachably latched; and a pretensioner for restraining an occupant with said seat belt by retracting said seat belt buckle at the time of generation of an impact to a vehicle, wherein said pretensioner comprises: a wire of which one end is connected to said seat belt buckle; a piston which is connected to the other end of said wire; a cylinder which accommodates said piston therein such that said piston is slidable; a housing through which said wire is passed and which supports said cylinder; a gas supply unit which supplies gas, for moving said piston in a direction of retracting said wire, into said cylinder through said housing; and a seal member which is disposed inside said housing to seal a clearance between said wire and the inner wall of said housing, and is characterized in that an agent for improving the heat resistance is applied to said wire.

In the seat belt apparatus as mentioned above, the aforementioned pretensioner is provided, thereby reducing the number of parts of the pretensioner, solving the problem of complication of assembly, and thus reducing the manufacturing cost.

EFFECT OF THE INVENTION

According to the present invention, it is possible to protect the wire without leading to increase in manufacturing cost of parts.

BEST MODE FOR CARRYING OUT THE INVENTION

Hereinafter, a preferred embodiment of a pretensioner and a seat belt apparatus according to the present invention will be described in detail with reference to attached drawings.

FIG. 1 is a perspective view showing a seat belt apparatus with a pretensioner of the embodiment according to the present invention.

In this drawing, the seat belt apparatus 1 comprises a seat belt 3 for restraining an occupant which can be withdrawn from a retractor 2. The retractor 2 is a device for winding up the seat belt 3 and is fixed to a lower portion of a center pillar 4 in a cabin of a vehicle (an automobile in this example). The seat belt 3 withdrawn from the retractor 2 to extend toward an upper portion of the vehicle passes through a through ring 5 and is bent at the through ring 5 to extend toward a lower portion of the vehicle. The distal end of the seat belt 3 is fixed to an anchor plate 7 which is disposed between the center pillar 4 and a seat 6.

At a portion of the seat belt 3 between the through ring 5 and the anchor plate 7, a tongue 8 is attached to the seat belt 3 such that the seat belt 3 passes through the tongue 8. The tongue 8 can be latched with a seat belt buckle 9 which is disposed on a side opposite to the anchor plate 7 relative to the seat 6.

The pretensioner 10 of this embodiment is mounted to the seat belt buckle 9. The pretensioner 10 is a device for retracting the seat belt buckle 9 when an impact is generated, for example, at the time of a sudden stop or a collision of the vehicle, thereby restraining the occupant with the seat belt 3.

The pretensioner 10 comprises a wire 11 connected to the seat belt buckle 9, a housing 12 which is fixed to, for example, a vehicle body directly or via brackets (not shown) and through which the wire 11 is inserted, a holder 13 which is attached to one side of the housing 12 and has a guide portion 13a (see FIG. 2) for guiding the wire 11 such that a portion of the wire 11 is bent, and a cylinder 14 which is attached to the other side of the housing 12.

FIG. 2 is a vertical sectional view of the pretensioner 10. In this drawing, one end of the wire 11 is connected to the seat belt buckle 9 (see FIG. 1) and the other end of the wire 11 is connected to the piston 15. The piston 15 is slidably accommodated in the cylinder 14.

The piston 15 comprises a piston main body 16 through which the wire 11 is inserted, and a wire holding portion 17 which is connected to an end of the piston main body 16 and fixes the other end of the wire 11. The piston main body 16 is provided with an annular groove 18 in which an O-ring 19 for sealing a clearance between the piston main body 16 and an inner wall of the cylinder 14 is disposed.

The piston main body 16 has a tapered portion 20 which is formed on the distal end side (on the side of the wire holding portion 17) relative to the annular groove 18 and gradually increases in diameter toward the distal end side. Between the tapered portion 20 and the inner wall of the cylinder 14, a ball ring 21 and a plurality of balls 22 are arranged. This arrangement allows the piston 15 to move in a direction toward the distal end (direction A) and prevents the piston 15 from moving in a direction toward the proximal end (direction B).

The housing 12 for supporting the cylinder 14 is provided with a gas generator 23 which generates high-pressure gas for moving the piston 15 in the direction A. The gas generator 23 has a gas generating section and an ignition section which are not shown. As a rapid deceleration of the vehicle is detected by, for example, a sensor (not shown), an ignition signal is transmitted to the ignition section so that the ignition section is activated and the gas generating section spouts out high-temperature high-pressure gas.

Inside the housing 12, a gas passage 24 for supplying the high-pressure gas spouted from the gas generator 23 to the cylinder 14 and a seal receiving portion 25 which gradually decreases in diameter toward the holder 13 are formed. The gas passage 24 is formed between the cylinder 14 and the seal receiving portion 25 in the housing 12.

Arranged in the seal receiving portion 25 is a seal member 30 for sealing a clearance between the wire 11 and the inner wall of the housing 12. The seal member 30 has a tapered shape which gradually decreases in diameter toward the holder 13 corresponding to the diameter of the seal receiving portion 25 as shown in FIGS. 2 and 3. The seal member 30 is made of, for example, a rubber material (such as a synthetic rubber containing additives), a synthetic resin, or a metal having elasticity. The inner diameter of the through hole 28 of the seal member 30 is slightly larger than the outer diameter of the wire 11 such that the wire 11 is slidable relative to the seal member 30.

The wire 11 is disposed to pass a radial center of the gas passage 24 in the axial direction. The region shown by X in FIG. 2 of the wire 11 at least positioned within the gas passage 24 (for example, between the piston 15 and the seal member 30) is an agent applied portion 11A on which a predetermined agent for improving the heat resistance of the wire 11 is previously applied (including a state where the wire is dipped in an impregnating bath so that the wire is impregnated with the agent and a state where the agent component is supplied and bonded to the wire as well as a state where the wire is daubed with the agent). It should be understood that the agent applied portion 11A may extend a wider region along the axial direction of the wire including, for example, an area positioned inside the seal member 30 and an area positioned inside the piston main body 16 (or the wire holding portion 17) in addition to the region shown by X. Alternatively, the entire area of the wire 11 positioned inside the housing 12 and the entire area positioned inside the cylinder 14 may be the agent applied portion 11A.

As an example of the agent, an agent containing at least one of a group consisting of cyanoacrylate, silicone, and epoxy may be used. Also an agent which is known in the art to be used as a coating agent or adhesive and contributes to improvement of the heat resistance of the wire 11 may be used.

As described in the above, the gas generator 23 and the gas passage 24 compose a gas supplying device as claimed in claims.

In this embodiment having the aforementioned structure, as the sensor detects a rapid deceleration of the vehicle, for example, due to occurrence of a sudden stop or a collision of the vehicle, an ignition signal is transmitted to the ignition section of the gas generator 23 so that high-pressure gas is spouted out from the gas generator 23. Then, the high-pressure gas is supplied to the cylinder 14 through the gas passage 24 in the housing 12. Thus, the piston 15 is displaced in a direction A in FIG. 2 so that the wire 11 is retracted as shown in FIG. 4. According to the retraction of the wire 11, the seat belt buckle 9 is retracted.

During this, the seal member 30 is pushed toward the seal receiving portion 25 by the high-pressure gas within the gas passage 24 so that the seal member 30 is kept in close contact with the seal receiving portion 25 as shown in FIG. 4. As a result, the wire 11 is displaced sliding relative to the seal member 30. In the embodiment, since the heat resistance of the wire 11 is improved by applying the aforementioned agent to the wire 11, the wire 11 is protected even if the high-pressure gas spouted out from the gas generator 23 into the housing 12 as mentioned above collides with the wire 11. This can eliminate the need for separately preparing a guide pipe as the prior art, thereby reducing the number of parts, solving the problem of complication of assembly, and thus reducing the manufacturing cost.

In case that a function of reducing the spaces among a plurality of wire elements (wire threads) composing the wire 11 (a function of contracting and reducing the sectional area of the entire wire) is obtained by using the cyanoacrylate agent, the silicone agent, and/or the epoxy agent, particularly great effect of improving the strength of the entire wire 11 is obtained, thus also increasing the durability.

The present invention is not limited to the aforementioned structure, various modifications and variations can be made without departing from the technical spirit of the invention. For instance, though the configuration of the seal member 30 is a tapered shape in the aforementioned embodiment, the configuration of the seal member is not limited thereto and may be a cylindrical shape of which outer diameter is entirely uniform in the axial direction.

Though the aforementioned description has been made for an example where the present invention is applied to an automobile as a vehicle in the aforementioned embodiment, the present invention is not limited thereto and can be applied to any vehicle provided with a seat belt for restraining an occupant to a seat or a predetermined position, for example, vehicles including rail vehicles such as a train, a bullet train, and a monorail, boats including a hovercraft and a hydrofoil craft, and other transport facilities, and further a vehicle installed at an amusement park as an amusement park ride, and a business or general elevator machine installed in a building.

Figure 1:
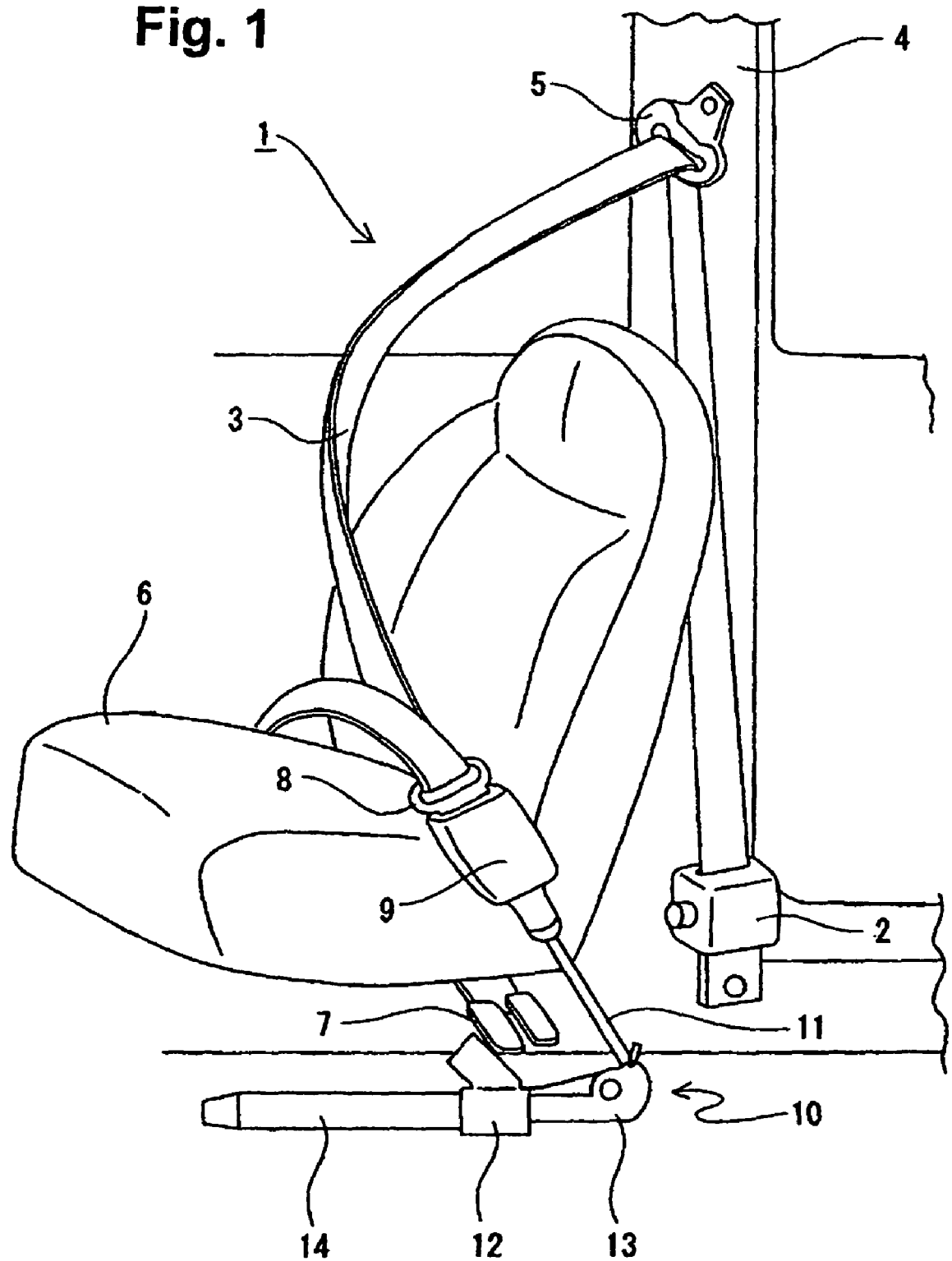
FIG. 1 is a perspective view showing a seat belt apparatus with a pretensioner of an embodiment according to the present invention.
Figure 2:
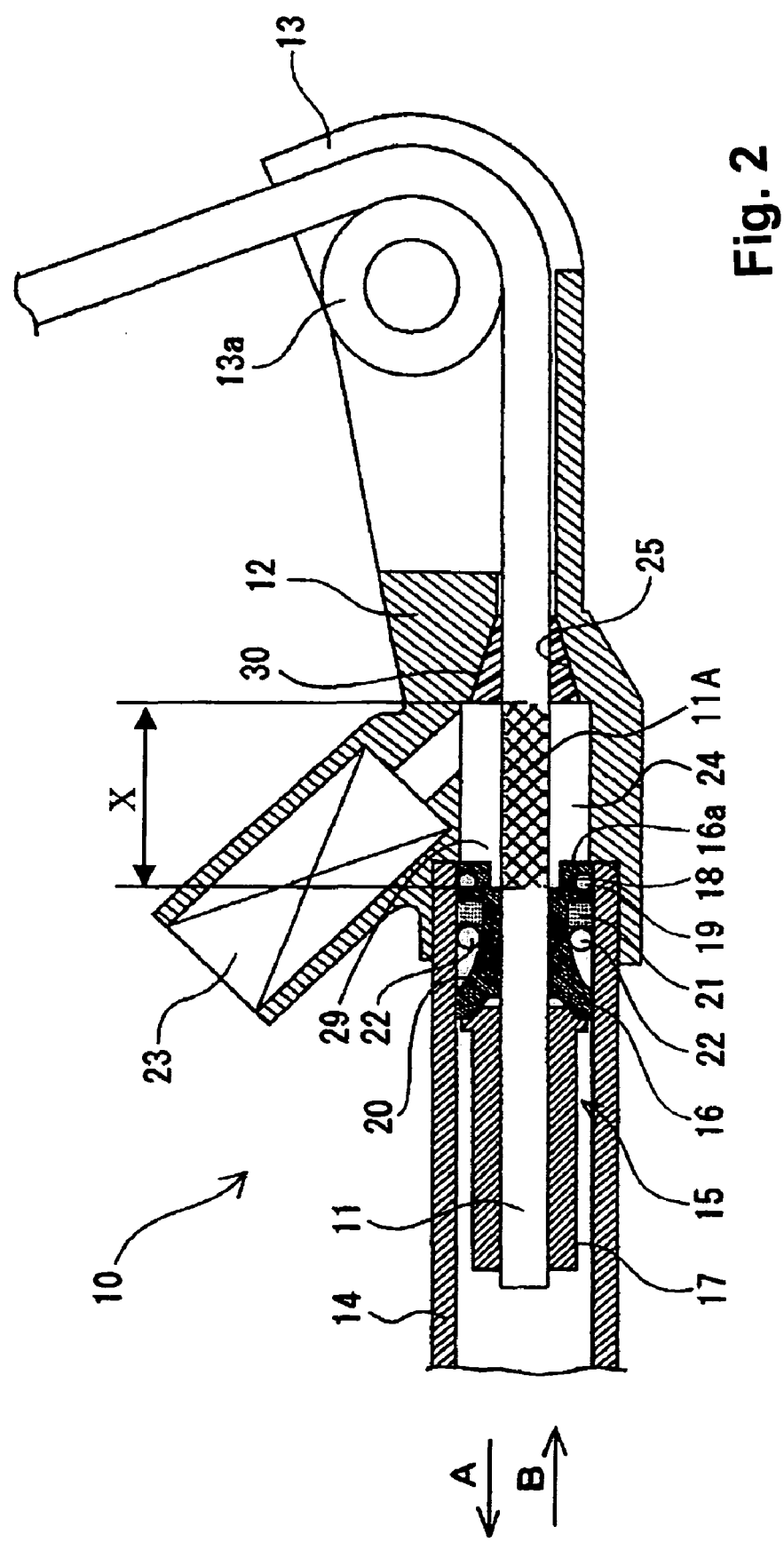
FIG. 2 is a vertical sectional view of the pretensioner shown in FIG. 1.
Figure 3:
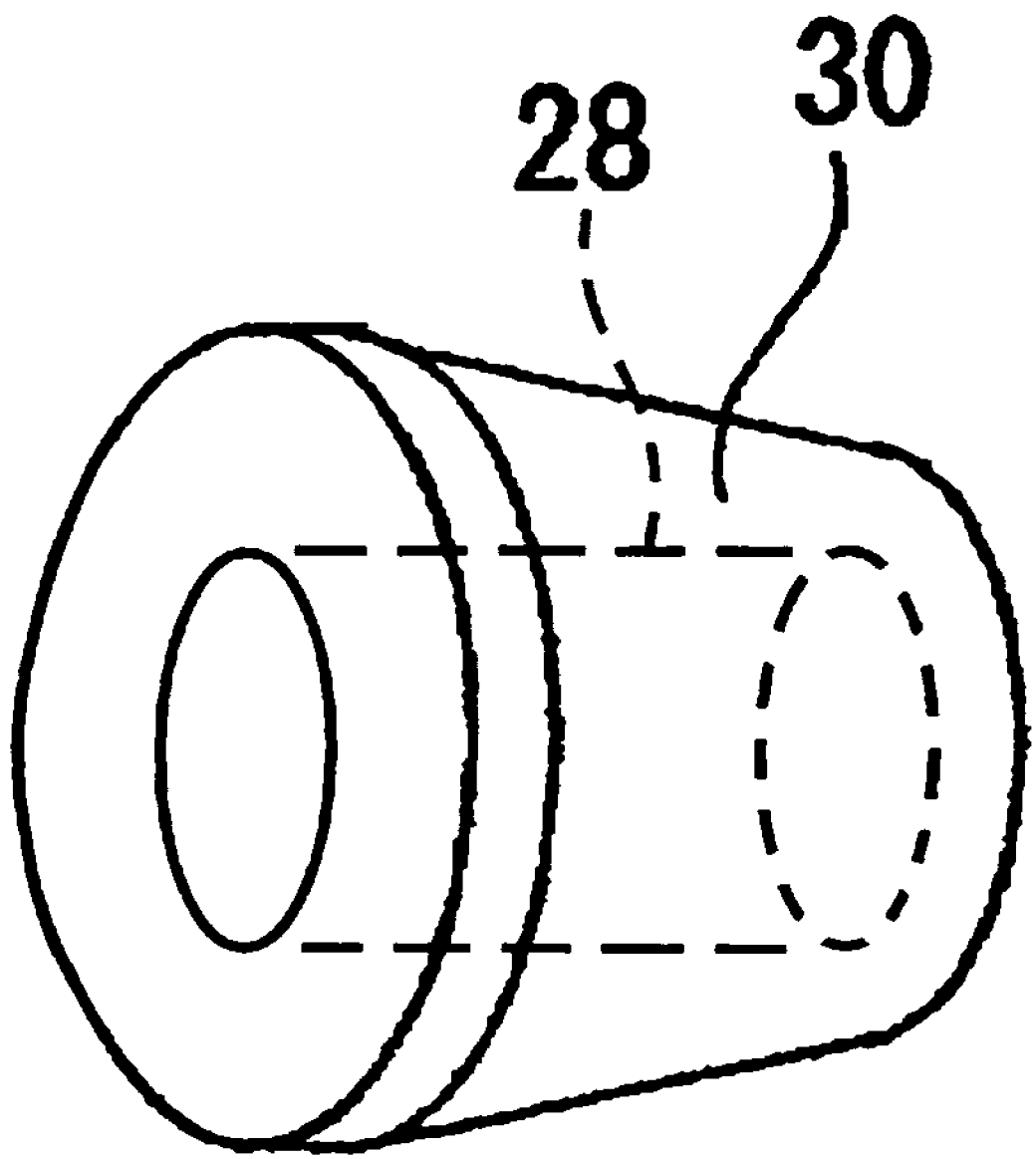
FIG. 3 is a perspective view showing a seal member shown in FIG. 2.
Figure 4:
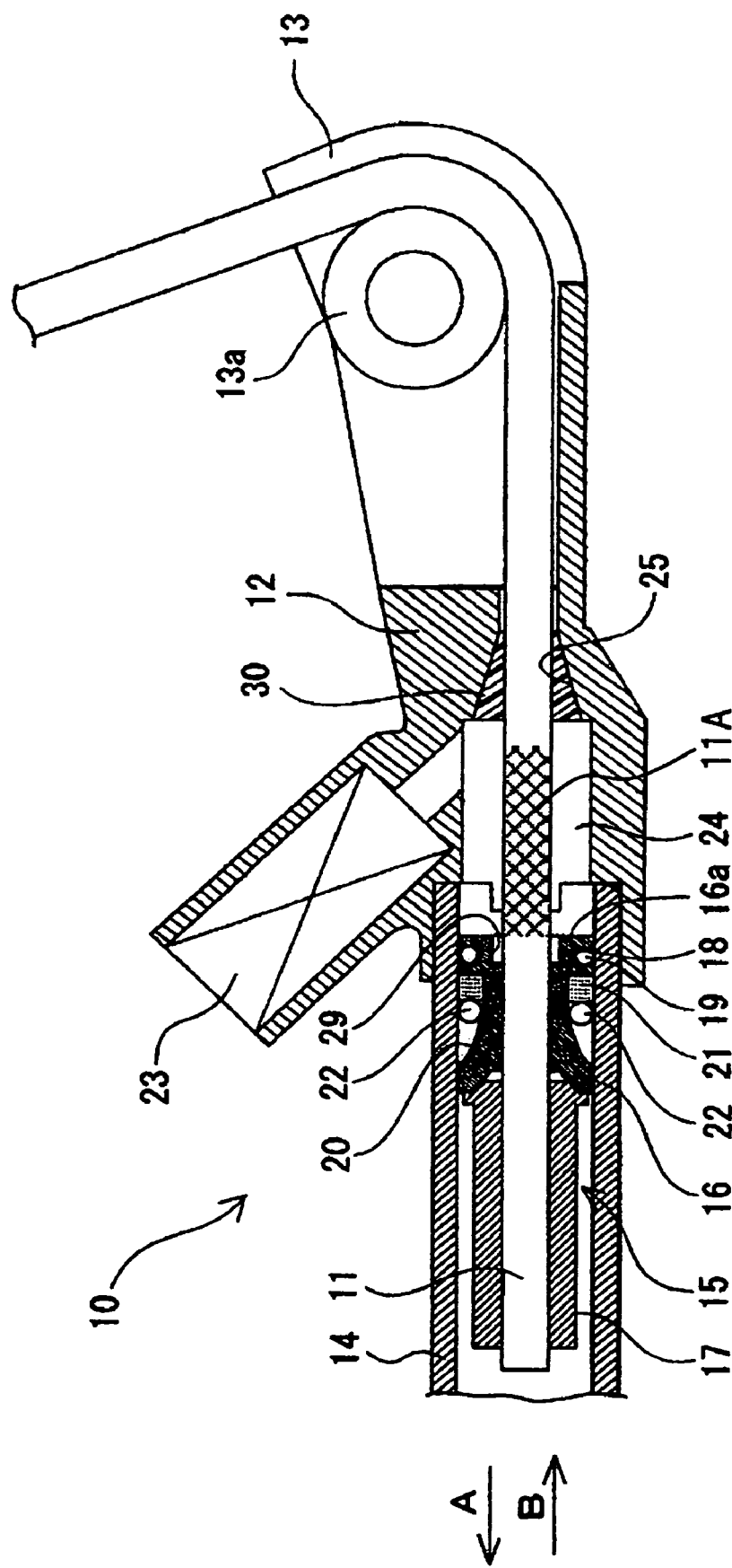
FIG. 4 is a vertical sectional view of the pretensioner shown in FIG. 2 in operation.

EXPLANATION OF REFERENCE SIGNS IN DRAWINGS 1 seat belt apparatus
2 retractor
3 seat belt
8 tongue
9 seat belt buckle
10 pretensioner
11 wire
11A agent applied portion
12 housing
14 cylinder
15 piston
16a proximal face
23 gas generator (gas supply unit)
24 gas passage (gas supply unit)
30 seal member

What is claimed is:

1. A pretensioner for restraining an occupant with a seat belt by retracting a seat belt buckle, comprising:
  a wire having one end adapted to be attached to the seat belt buckle,
  a piston connected to the other end of the wire,
  a cylinder slidably accommodating the piston therein,
  a housing having a gas passage therein, and a wire passage formed at one side thereof through which the wire enters the gas passage, said cylinder being attached to and supported by the housing at a side opposite to the wire passage,
  a seal member disposed around the wire passage at a side of the gas passage for sealing around the wire,
  a heat resistance agent directly applied to at least a portion of the wire located in the gas passage, and
  a gas supply unit attached to the housing for supplying gas to the gas passage,
  wherein a substantially entire one side of the piston directly faces the gas passage and the wire extends to the piston through the gas passage while directly exposing the heat resistance agent to the gas passage so that when the gas supply unit is operated to supply gas to the gas passage, the piston is moved in a direction of retracting the wire while the wire is protected from gas heat by the heat resistance agent, and
  wherein said housing further includes a seal receiving portion at a side of the gas passage, said seal receiving portion having an inner diameter gradually decreasing in a direction away from the gas passage, and said seal member has a tapered shape gradually decreasing from one side to a side opposite thereto, said seal member with the tapered shape being disposed in the seal receiving portion.

2. A pretensioner as claimed in claim 1, wherein said heat resistance agent is at least one material selected from the group consisting of cyanoacrylate agent, silicone agent, and epoxy agent.

3. A pretensioner as claimed in claim 1, wherein said heat resistance agent is impregnated into the wire.

4. A seat belt apparatus, comprising:
  a seat belt,
  a retractor for winding up said seat belt,
  a tongue attached to said seat belt,
  a seat belt buckle with which said tongue is detachably latched, and
  the pretensioner as claimed in claim 1.

5. A pretensioner for restraining an occupant with a seat belt by retracting a seat belt buckle, comprising:
  a wire having one end adapted to be attached to the seat belt buckle,
  a piston connected to the other end of, the wire,
  a cylinder slidably accommodating the piston therein,
  a housing having a gas passage therein, and a wire passage formed at one side thereof through which the wire enters the gas passage, said cylinder being attached to and supported by the housing at a side opposite to the wire passage, a seal member disposed around the wire passage at a side of the gas passage for sealing around the wire, a heat resistance agent directly applied to at least a portion of the wire located in the gas passage, and a gas supply unit attached to the housing for supplying gas to the gas passage, wherein a substantially entire one side of the piston directly faces the gas passage and the wire extends to the piston through the gas passage while directly exposing the heat resistance agent to the gas passage so that when the gas supply unit is operated to supply gas to the gas passage, the piston is moved in a direction of retracting the wire while the wire is protected from gas heat by the heat resistance agent, wherein said heat resistance agent is impregnated into the wire, and wherein said heat resistance agent is cyanoacrylate.

* * * * *